United States Patent
Sholem

(10) Patent No.: US 7,882,987 B2
(45) Date of Patent: Feb. 8, 2011

(54) KITCHEN DISPENSER

(76) Inventor: Steven Sholem, 6121 N. 1st Ave., Phoenix, AZ (US) 85013

( * ) Notice: Subject to any disclaimer, the term of this patent is extended or adjusted under 35 U.S.C. 154(b) by 0 days.

(21) Appl. No.: 12/467,923

(22) Filed: May 18, 2009

(65) Prior Publication Data

US 2009/0224003 A1 Sep. 10, 2009

Related U.S. Application Data

(63) Continuation-in-part of application No. 11/427,240, filed on Jun. 28, 2006, now abandoned.

(60) Provisional application No. 60/773,616, filed on Feb. 14, 2006.

(51) Int. Cl.
*B65D 88/54* (2006.01)

(52) U.S. Cl. ........................ 222/305; 222/149; 222/156; 222/235; 222/288; 222/361; 222/342; 366/309

(58) Field of Classification Search ................... 222/51, 222/148–151, 154–159, 144, 233–235, 288, 222/307–308, 361–362, 305, 342; 366/143, 366/309, 312
See application file for complete search history.

(56) References Cited

U.S. PATENT DOCUMENTS

| | | | |
|---|---|---|---|
| 714,026 A | 11/1902 | Perkins | |
| 1,273,720 A | 7/1918 | Bachand | |
| 2,047,317 A * | 7/1936 | Esslen | 366/309 |
| 2,852,167 A | 9/1958 | Lempart | |
| 3,007,612 A | 11/1961 | Tepper | |
| 3,056,532 A | 10/1962 | Germano | |
| 3,347,425 A | 10/1967 | Beushausen et al. | |
| 4,004,719 A * | 1/1977 | Weitzman | 222/366 |
| 4,130,149 A | 12/1978 | Hausam | |
| 4,162,751 A | 7/1979 | Hetland et al. | |
| 4,287,921 A * | 9/1981 | Sanford | 141/360 |
| 4,448,331 A | 5/1984 | Millette et al. | |
| 4,560,092 A | 12/1985 | Souza | |
| 4,569,463 A | 2/1986 | Pellegrino | |
| 4,582,225 A | 4/1986 | Peden et al. | |
| 4,673,111 A | 6/1987 | Gold | |
| 4,779,521 A | 10/1988 | Brumfield | |
| 4,955,510 A | 9/1990 | Newnan | |
| RE34,382 E | 9/1993 | Newnan | |
| 5,642,762 A * | 7/1997 | Greenberg et al. | 141/358 |
| 5,833,097 A * | 11/1998 | Ruth | 222/368 |
| 5,855,300 A | 1/1999 | Malki | |

(Continued)

*Primary Examiner*—Kevin P Shaver
*Assistant Examiner*—Andrew Bainbridge
(74) *Attorney, Agent, or Firm*—Schmeiser, Olsen & Watts LLP

(57) ABSTRACT

A kitchen dispenser for storing and dispensing dry goods is provided. The dispenser includes a canister having a front portion, a back portion and a lid repeatably and releasably coupled together. An open space is defined between the front portion, rear portion and lid. The dispenser includes an aperture in a bottom side of the front portion and a movable dispensing mechanism coupled to the bottom portion of the canister. The dispensing mechanism includes a variable measurement device corresponding to the aperture in the bottom side of the front portion, the dispensing mechanism moveable between a dispensing position and a filling position. The kitchen dispenser further includes a scraper plate coupled to the bottom side of the front portion, the scraper plate in contact with a top side of the dispensing mechanism during movement between filling and dispensing positions.

19 Claims, 13 Drawing Sheets

U.S. PATENT DOCUMENTS 6,308,860 B2 10/2001 Eagle
6,929,158 B2 8/2005 Smiley
6,991,134 B2 1/2006 Bailey
7,134,573 B2 11/2006 Post

* cited by examiner

KITCHEN DISPENSER

CROSS REFERENCE TO RELATED APPLICATIONS

This application is a continuation-in-part of U.S. patent application entitled "KITCHEN DISPENSER," Ser. No. 11/427,240, filed Jun. 28, 2006, which claims priority to U.S. Provisional Patent Application entitled "KITCHEN DISPENSER," Ser. No. 60/773,616, filed Feb. 14, 2006, the disclosures of which are hereby incorporated entirely herein by reference.

BACKGROUND OF THE INVENTION

1. Technical Field

This invention relates generally to a kitchen canister and more particularly to a kitchen dispenser for the dispensing of dry goods.

2. State of the Art

The use of canisters within a kitchen for storage of dry goods is common. Canisters serve to store dry goods such as flour, sugar, salt, rice and other goods. Conventional canisters rest on a counter top, in a pantry and/or other location within or near a kitchen. A conventional canister has a lid that may be opened to gain access to the dry goods stored within the canister. A measurement cup is then used to scoop out the dry goods in measurements desired. Others simply lift the canister and pour out the amount of dry goods needed.

The conventional canisters come in various sizes and are difficult to insert a measurement cup within to obtain the desired amount of dry goods. Further, as the level within the canister is reduced, it becomes more difficult to obtain the desired amount of dry goods for any particular use. The deeper a person must reach within the canister the harder it is to fill a measurement cup up with enough dry goods for the persons needs. The person often must resort to filling a larger measurement cup with a smaller one that can be more easily filled within the canister. This becomes less efficient, takes additional time and uses additional resources in order to obtain the desired amount of dry goods from the canister.

A conventional approach often used to attempt to solve this problem with canisters only serves to create an additional problem. This approach is pouring the dry goods out of the canister by lifting the canister and tipping it until the dry goods pour out of the opening and into a measurement device. Using this approach it is difficult to accurately pour the amount needed. Additionally, conventional canisters are not configured to pour and therefore as a person pours dry goods out of a canister, often a portion of dry goods is emptied onto a counter and/or floor, thereby creating an additional mess for the person to clean.

Accordingly, there is a need in the field of kitchen canisters for an improved kitchen dispenser that stores the same dry goods as canisters.

DISCLOSURE OF THE INVENTION

The present invention relates to a kitchen dispenser for dispensing dry goods at a particular measurement by use of a moveable dispensing mechanism without the need of removing the lid of the dispenser.

An aspect of the present invention includes a kitchen dispenser for storing and dispensing dry goods, the dispenser comprising a canister having a top portion and a bottom opposing portion, the canister configured to receive dry goods through the top portion and retain the dry goods within the canister, a movable dispensing mechanism coupled to the bottom portion of the canister, wherein the dispensing mechanism comprises a variable measurement device.

Another aspect of the present invention includes a kitchen dispenser for storing and dispensing dry goods, the dispenser comprising a canister configured to receive and retain dry goods, a movable dispensing mechanism couples to a bottom portion of the canister, the dispensing mechanism having a measurement device, wherein the dispensing mechanism is moveable between three positions.

Yet, another aspect of the present invention includes a kitchen dispenser system for storing and dispensing a plurality of dry goods, the dispensing system comprising a plurality of kitchen dispensers, each dispenser comprising a canister having a top portion and a bottom opposing portion, the canister configured to receive dry goods through the top portion and retain the dry goods within the canister and a movable dispensing mechanism coupled to the bottom portion of the canister, wherein the dispensing mechanism comprises a variable measurement device, and a wall mount coupling the plurality of dispensers onto a wall.

Another aspect of the present invention includes a kitchen dispenser for storing and dispensing dry goods, the dispenser comprising a canister having a front portion, a back portion and a lid removably coupled together, wherein an open space is defined between the front portion, rear portion and lid. The bottom portion may include an aperture. The dispenser may include a movable dispensing mechanism coupled to the bottom portion of the canister, wherein the dispensing mechanism comprises a variable measurement device that may be moved between a dispensing position and a filling position. In the filling position, the measurement device is in a position under the aperture for receiving dry goods from within the open space of the canister.

The foregoing and other features and advantages of the present invention will be apparent from the following more detailed description of the particular embodiments of the invention, as illustrated in the accompanying drawings.

DETAILED DESCRIPTION OF EMBODIMENTS OF THE INVENTION

As discussed above, embodiments of the present invention relate to a kitchen dispenser for dispensing dry goods at a particular measurement by use of a moveable dispensing mechanism without the need of removing the lid of the dispenser. In general, embodiments of a kitchen dispenser in accordance with the present invention comprise a canister, a dispensing mechanism and a measurement device.

Figure 1:
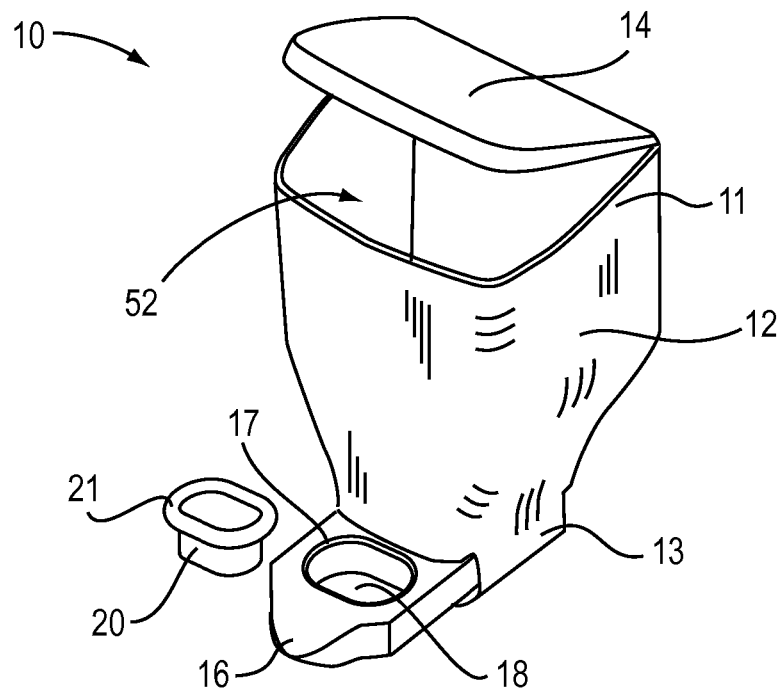
FIG. 1 is a perspective view of a kitchen canister in accordance with the present invention.

As shown in FIG. 1, particular embodiments of the present invention comprise a kitchen dispenser 10. The kitchen dispenser 10 comprises a canister 12, a lid 14, a dispensing mechanism 16, and a measurement device 18. The canister 12 may include a space 52, wherein the canister 12 receives and retains dry goods within the space 52. The lid 14 maybe hingedly coupled to the canister 12. The lid 12 may be opened to allow access to the open space 52 of the canister 12. When dry goods are present within the canister 12, the lid may be closed and locked into place to substantially seal and retain the dry goods and to further protect the dry goods from being mixed with other dry goods and to prevent entrance of other contaminating pests, such as, but not limited to insects and mice. Additionally, the lid 12 further aids in keeping the dry goods fresh. It will be understood that the dry goods may include, but is not limited to flour, sugar, coffee, rice, brown sugar, confectioner's sugar and the like.

Figure 6:
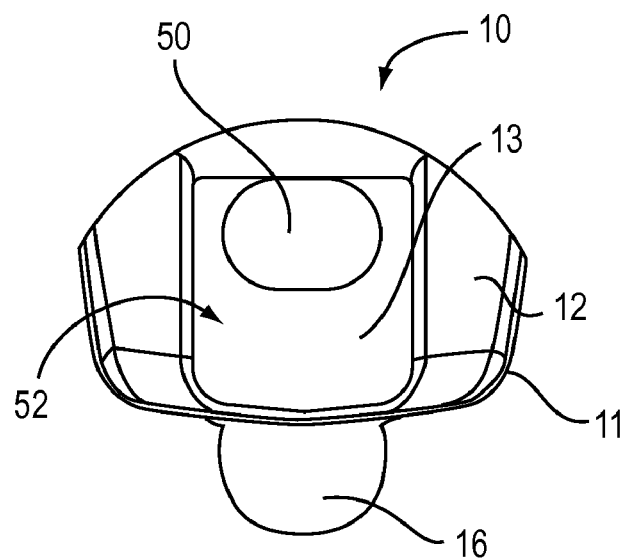
FIG. 6 is a top view of a kitchen dispenser with a measurement device in a neutral position.
Figure 7:
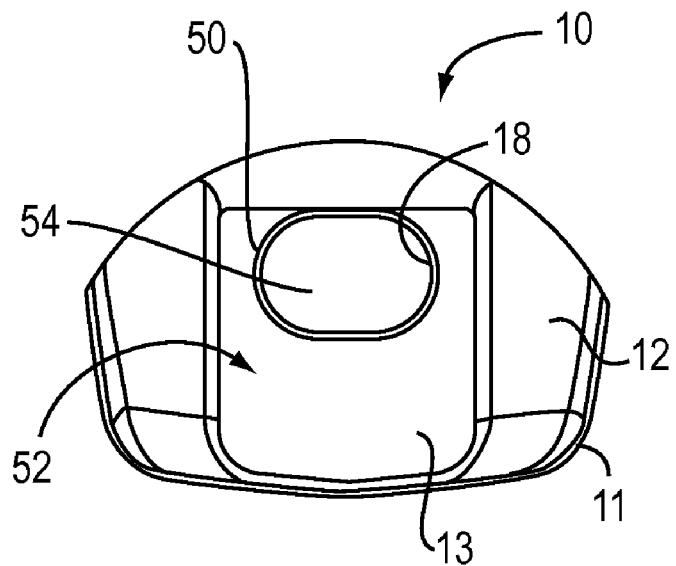
FIG. 7 is a top view of a kitchen dispenser with a measurement device in a filling position according to embodiments of the present invention.

Referring further to the drawings, FIGS. 1, 6 and 7 depict a kitchen dispenser 10 in accordance with the present invention. The kitchen dispenser 10 comprises a canister 12 having a top portion 11 and a bottom opposing portion 13. The canister configured to receive dry goods through the top portion 11 and retain the dry goods within the canister 12. The kitchen dispenser 10 further comprises a movable dispensing mechanism 16 coupled to the bottom portion 13 of the canister 12, wherein the dispensing mechanism 16 comprises a variable measurement device 18. The measurement device 18 may be a predetermined measurement size, wherein it is configured to receive various sizer inserts 20 of various sizes. For example and without limitation, the measurement device 18 may be a predetermined size of one cup, with measurement sizer inserts 20 that may have a range of measurements of about ¼ cup to about ¾ cup. The sizer inserts 20 changes the measurement size by reducing the volume of the measurement device 18, thereby reducing the amount of dry goods that can be held within the measurement device 18. It is contemplated that particular dispensers of the present invention may comprise a measurement device 18 of a predetermined size of ⅓ cup and one measurement sizer insert 20 of a predetermined size of ¼ cup. These two sizes enable a user of the kitchen dispenser 10 to obtain all typical measurement sizes. It will be understood that the measurement device 18 may be different sizes for each of a group of dispensers 10 to reflect the most common amount used for a particular dry good, or to match personal needs of a particular dry good.

The sizer insert 20 may have a lip 21, wherein the lip 21 is configured to fit within a recess 17 of the dispensing mechanism. The recess 17 allows the sizer 20 to rest within the measurement device 18 so that the top of the sizer 20 is essentially flush with the top of the dispensing mechanism 16. It will be understood that It will be understood by those of ordinary skill in the art that the measurement device 18 may be an aperture extending through the entire dispensing mechanism 16, wherein the measurement device is filled through the top side and dispenses through the bottom side. Other embodiments may include a measurement device 18, wherein the measurement device is a removable cup and the user removes the cup to dispense it into a bowl or other type of receptacle.

Figure 8:
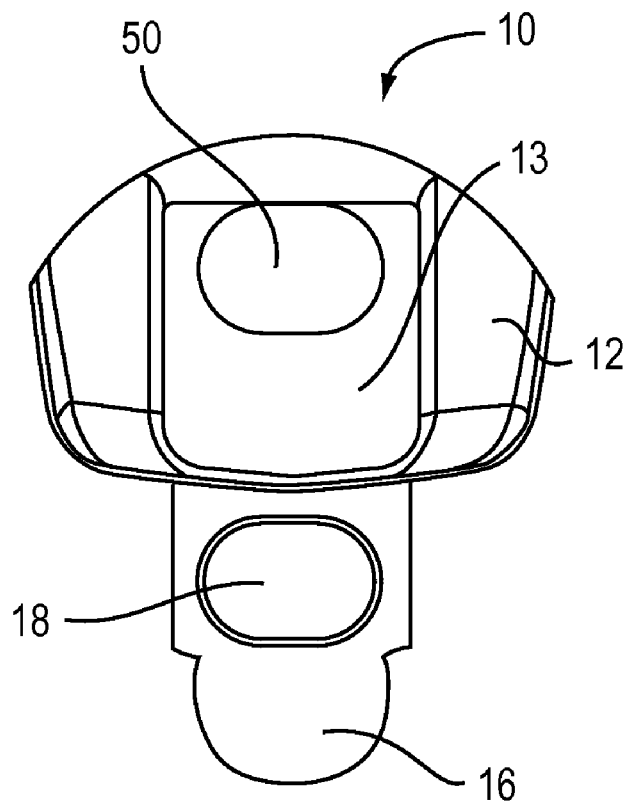
FIG. 8 is a top view of a kitchen dispenser with a measurement device in a dispensing position.

The dispensing mechanism 16 is movable between three positions. The first position may include a neutral position as shown in FIG. 6, wherein the measurement device 18 is retained within the bottom portion 13 of the canister 12, but is not in a position to fill the measurement device 18, such that dry goods placed within space 52 of the canister 12 is not dispensed through aperture 50. The second position may include a filling position as shown in FIG. 7 wherein the dispensing device may be pushed further within the bottom portion 13 of the canister 12, to provide access to the measurement device 18 through aperture 50, and filling only the predetermined measured amount 54 as determined by measurement device 18. The third position may include a dispensing position as shown in FIG. 8, wherein the dispensing mechanism 16 is pulled out to bring the measurement device 18 out of the bottom portion 13 of the canister 12, level off the predetermined measurement and dispense the dry goods at a predetermined measurement amount into a bowl or other receptacle as desired by the user. The aperture 50 may be sealed or otherwise closed such that the dry goods within the canister 12 are not permitted to exit the canister 12 through the aperture 50. After the dry goods are dispensed, the dispensing mechanism may be moved back into the neutral position as shown in FIG. 6 and the dry goods in the kitchen dispenser 10 may be retained and stored.

It will be understood by those of ordinary skill in the art that the dispensing mechanism 16 may be moveable between the three positions in other ways, such as, but not limited to rotating the dispensing mechanism about an axis, wherein the rotation moves from each of a neutral position, a filling position and a dispensing position.

Figure 2:
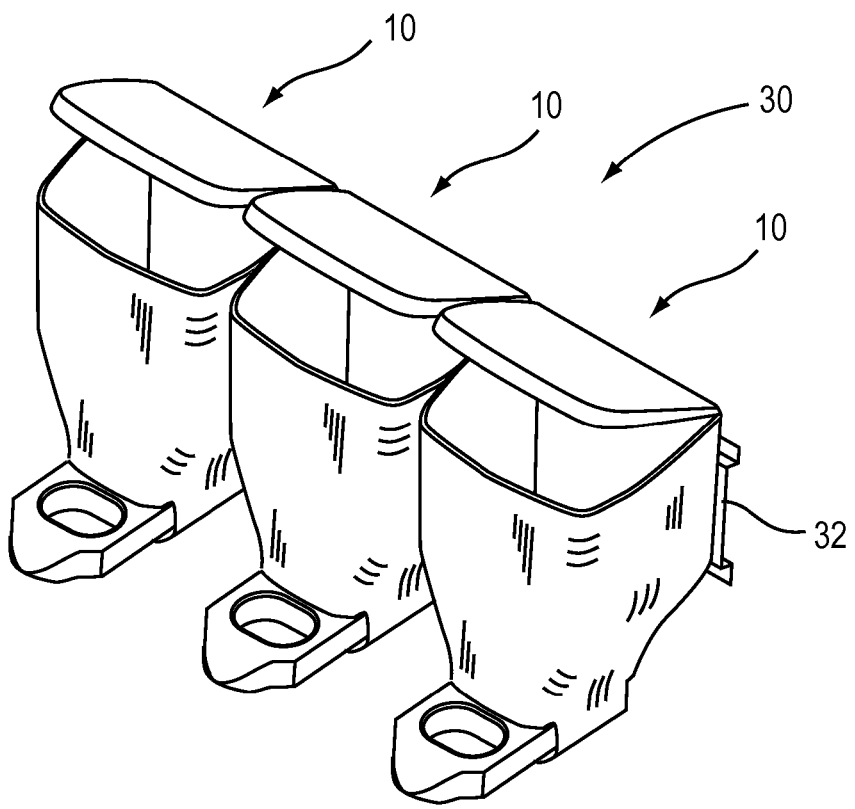
FIG. 2 is a perspective view of a plurality of kitchen canisters coupled together on a wall mount.
Figure 3:
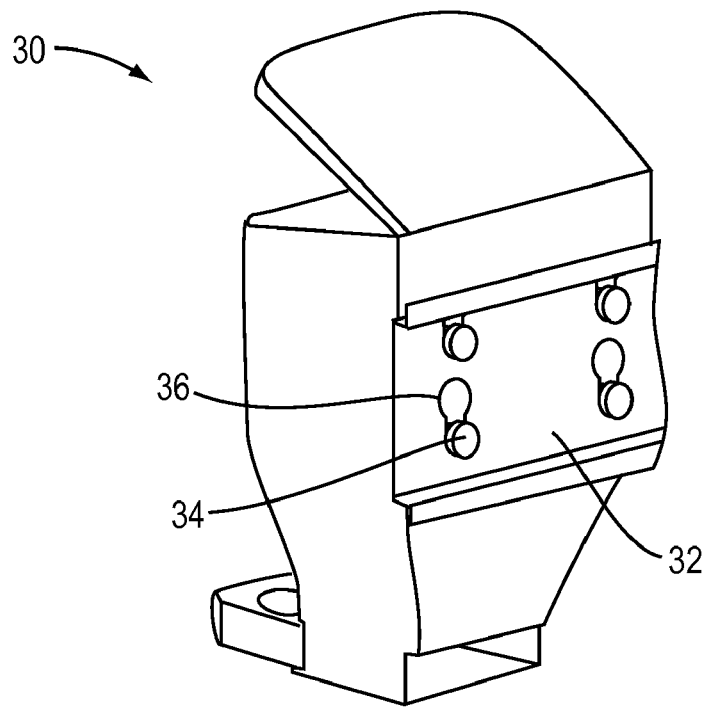
FIG. 3 is a perspective view of a back side of a plurality of kitchen canisters coupled to a wall mount according to embodiments of the present invention.

Referring further to the drawings, FIGS. 2-3 depict a kitchen dispenser system 30 for storing and dispensing a plurality of dry goods in accordance with the present invention. The dispensing system 30 comprises a plurality of kitchen dispensers 10, each dispenser 10 comprising a canister 12 having a top portion 11 and a bottom opposing portion 13. The canister 12 may be configured to receive dry goods through the top portion 11 and retain the dry goods within the canister 12. A movable dispensing mechanism 16 may be coupled to the bottom portion 13 of the canister 12, wherein the dispensing mechanism 16 comprises a variable measurement device 18, and a wall mount 32 coupling the plurality of dispensers 10 onto a wall. The wall mount 32 may a key hole 36 and is configured to receive a mounting device 34, the mounting device 34 coupled to the kitchen dispenser 10 and configured to lock within the key hole 36. Flanges 38 may be used to couple the wall mount 32 to the wall, thereby placing the dispensing system 30 at a particular, predetermined height to provide proper access to the plurality of kitchen dispenser 10. It will be understood that various types of wall mounts 32 may be utilized in accordance with the present invention, including, but not limited to, a sliding track, a shelf, a clamp, a clip, a hook, a magnet track and the like, as well as corresponding mounting devices 34 to attach to the mounts, such as, but not limited to a slide device, a clamp receiver, a clip receiver, a hook receiver, a magnet and the like respectively.

Figure 4:
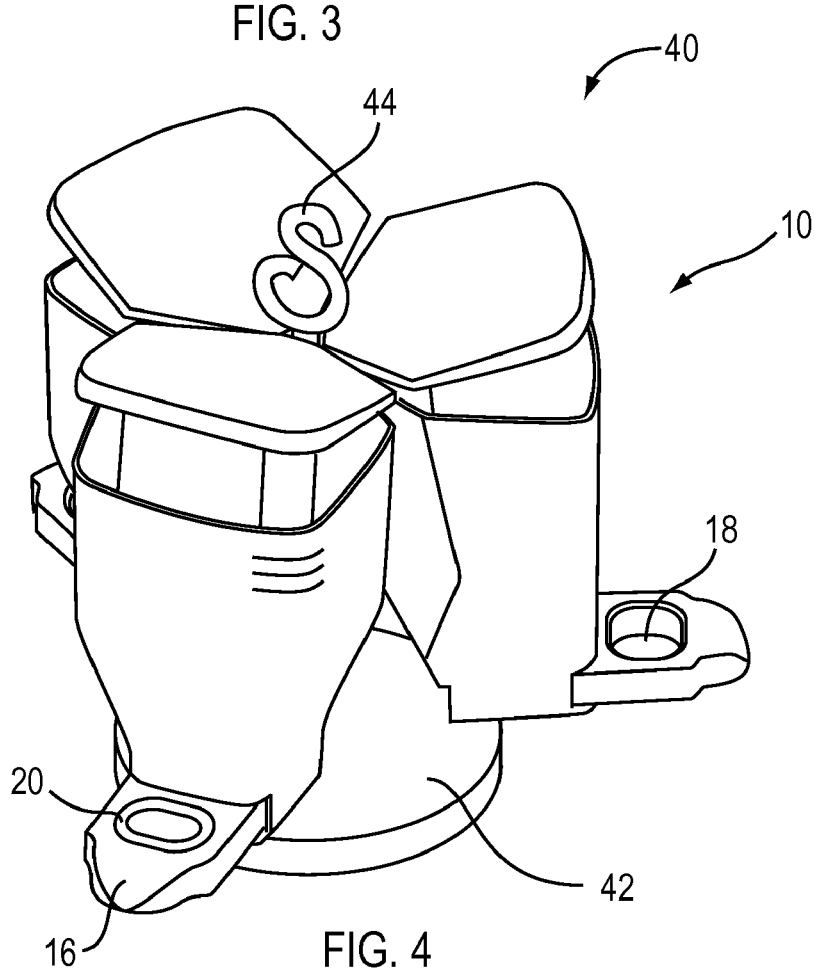
FIG. 4 is a perspective view of a plurality of kitchen canisters coupled to a rotating base with measurement devices of the canister in a neutral position.
Figure 5:
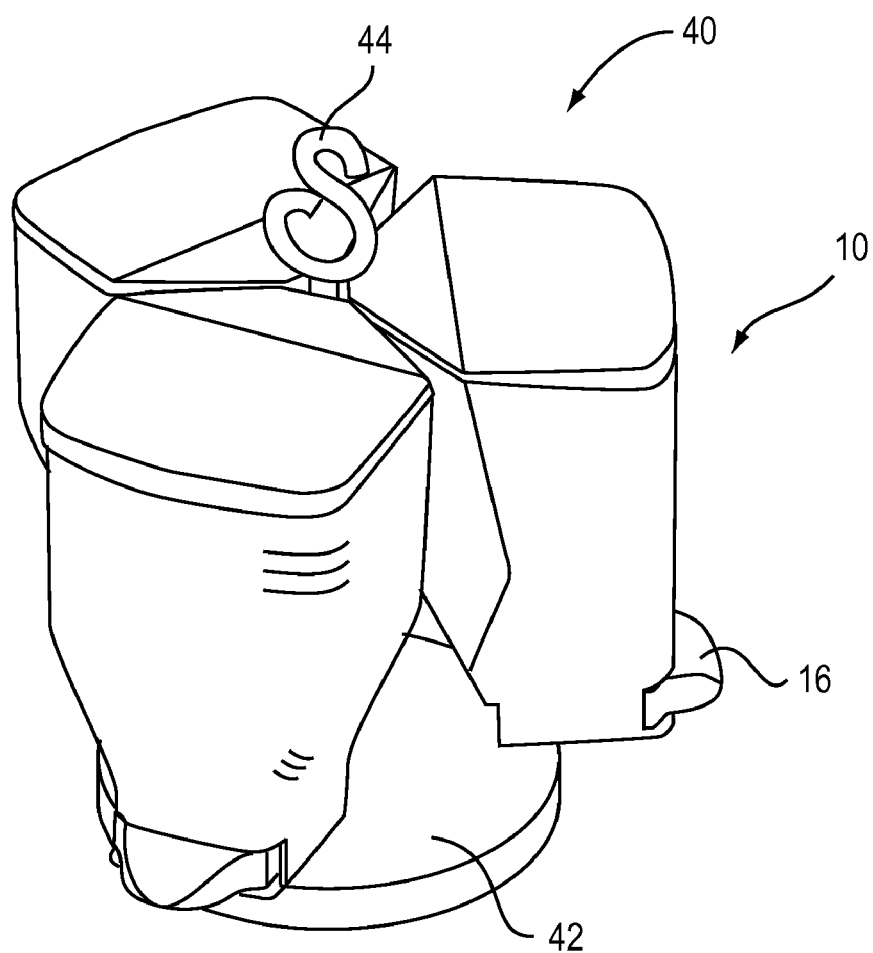
FIG. 5 is a perspective view of a plurality of kitchen canisters coupled to a rotating base with measurement devices of the canister in a filling position.

With further reference to the drawings, FIGS. 4-5 depict a kitchen dispenser system 40 for storing and dispensing a plurality of dry goods in accordance with the present invention. The dispensing system 40 comprises a plurality of kitchen dispensers 10, each dispenser 10 comprising a canister 12 having a top portion 11 and a bottom opposing portion 13. The canister 12 may be configured to receive dry goods through the top portion 11 and retain the dry goods within the canister 12. A movable dispensing mechanism 16 may be coupled to the bottom portion 13 of the canister 12, wherein the dispensing mechanism 16 comprises a variable measurement device 18, and a rotating base 42. The measurement device may further include a measurement sizer insert 20 that may be used between kitchen dispensers 10, or in particular embodiments, each dispenser 10 may have it own measurement sizer insert 20. The base 42 is rotatable to provide access to each particular kitchen dispenser 10. The dispensing system 40 may further comprise a hook 44, wherein the hook 44 may be used to hang the dispensing system 40 from a mount hook or other mounting device and allow the base 42 to rotate. The mounting using hook 44 raises the dispensing system 40 to a height that allows proper access to each kitchen dispenser. It will be understood that other types of dispensing system may be utilized so long as a plurality of kitchen dispensers 10 in accordance with the present invention are used, such as but not limited to, stacking the dispensers vertically.

It will be understood that the kitchen dispensers 10 in each dispensing system 30 and 40 may be detachable from the system and/or mount and individually cleaned or filled. It will further be understood that the mounting system will be of sufficient strength to hold the plurality of kitchen dispensers 10 properly.

Particular embodiments of the present invention may include a kitchen dispenser that has a canister that may hold up to 5 pounds of any particular dry goods, thereby allowing the storing and dispensing of a wide variety of dry goods that may be dispensed using a kitchen dispenser embodiment of the present invention. The measurement device and dispensing mechanism in particular embodiments of the present invention may include a seal to keep the dry goods fresh and to prevent contamination of the dry goods by pests such as, but not limited to insects and mice. Further, in particular embodiments the kitchen dispenser may include a label for labeling each kitchen dispenser with the particular type of dry good being stored within the canister of the kitchen dispenser. Additionally, other particular embodiments may be clear or have a clear portion to provide visual access to the dry goods to determine what type of dry good is stored within the dispenser and to determine the amount of dry good remaining in the dispenser to allow the user to determine when refilling of the dispenser is needed. Further still, the lid while shown to be hingedly attached may be coupled to the canister in other ways, such as, but not limited to press fit, threaded fit and clipped.

In operation, embodiments of the present invention may be used to dispense dry goods at the needed amount of a user. With reference to FIG. 1 and for the exemplary purposes of this disclosure, and not by way of limitation, use of particular embodiments includes selecting a kitchen dispenser 10. The kitchen dispenser 10 comprises a canister 12 filled with a particular dry good. The dispenser 10 has a moveable dispensing device 16 with a measurement device 18. The measurement device 18 is configured to receive a measurement sizer insert 20. A user may insert the sizer insert 20 into the measurement device 18, wherein the sizer 20 insert may reduce the measurement amount from ⅓ cup to ¼ cup. The measurement device 18 and the sizer 20 each have a through aperture wherein the dry good is filled through the top of the aperture and dispensed through the bottom of the aperture. To fill measurement device 18 or the sizer 20, the dispensing mechanism 16 is moved from a neutral position and pressed into the dispenser 10. In this position, the measurement device 18 or the sizer 20 is filled with the dry good. The dispensing mechanism 16 is then moved back into the neutral position, wherein the amount of the dry good within the measurement device 18 or the sizer 20 is leveled off at the desired amount provided by the measurement device 18 or the sizer 20. The dispensing mechanism 16 may then be moved from a neutral position and pulled out of the dispenser 10 to dispense the dry good. Prior to dispensing the dry good, the user may place a bowl or other container under the dispenser 10, thereby allowing the measured dry good to fall out through the bottom of the measurement device 18 or the sizer insert 20 into the bowl. This action may be repeated until the proper measurement of dry good is dispensed into the bowl.

Embodiments of a kitchen dispenser in accordance with the present invention may be formed of various types of material such as, but not limited to plastics, metals, such as stainless steel, ceramics, composites and any combination thereof. It will be understood that all components may be formed of the same material or may be formed of various materials. Additionally, the components may be of any type of finish and color, so as to better coordinate with the overall décor of the user's kitchen.

Other particular embodiments of the present invention may include a method of using a kitchen dispenser. The method may comprise the steps of moving a dispensing mechanism from a neutral position to a filling position and automatically filling a measurement device with a predetermined amount of a dry good dependent on the measuring device size. The method may further comprise the steps of moving the measurement device from the filling position to the neutral position, wherein the movement levels the amount of dry good in the measuring device. Further still, the method may comprise moving the measurement device from the neutral position to a dispensing position and dispensing the dry good.

In particular embodiments of the present invention the method may further comprising preliminary steps of determining the amount of dry good needed and selecting the proper measurement device size. Additionally, the method may include a step of retaining the measurement device in the neutral position for storing the dry good within the kitchen dispenser when the kitchen dispenser is not in use.

Figure 17:
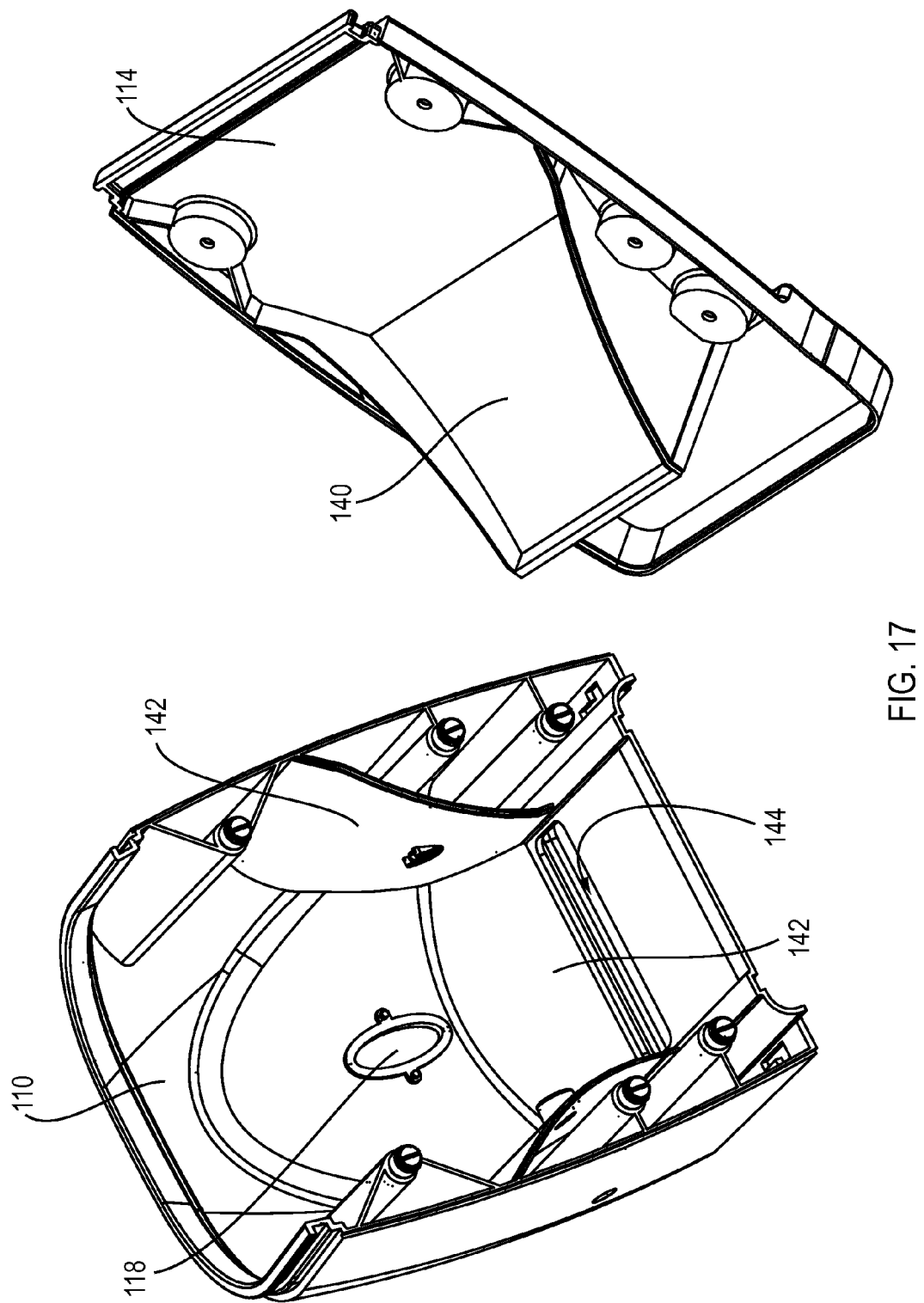
FIG. 17 is an exploded view of a front and back portion of a canister of a kitchen dispenser in accordance with the present invention.

Referring to the drawings again, FIGS. 9A-9D depict a kitchen dispenser 100 for storing and dispensing dry goods in accordance with particular embodiments of the present invention. The kitchen dispenser 100 comprises a canister 105 having a front portion 110, a back portion 114 and a lid 112 repeatably and releasably coupled together. An open space is defined between the front portion 110, back portion 114 and lid 112. The front portion 110 includes an aperture 144 in a bottom side of the front portion 110 (See FIG. 17). The front portion 110 may optionally include a display 106 for displaying written indicia, such as the type of dry goods stored within the kitchen dispenser 100. The kitchen dispenser 100 may also include a mounting brace 124, wherein the mounting brace 124 is coupled to a wall surface and canister 105 is removably coupled to the mounting brace 124 by use of protrusions 115 of the back portion 114 that engages the mounting brace 124 in slots 117. Some embodiments, the kitchen dispenser is mounted directly to a wall surface.

The kitchen dispenser 100 further includes a gasket 125. The gasket 125 performs two functions. First, the gasket 125 couples the front portion 110 and the rear portion 114 together on an end the lid 112 couples to top ends 111 and 113 of the front and rear portions 110 and 114 respectively. Once the gasket is in place, connectors 126 may be used to securely couple the back portion 114 to the front portion 110. Second, the gasket 125 once coupled to the front and back portions 110 and 114 serves as a seal when the lid 112 is coupled to the top ends 111 and 113 of the front portion and the back portion 110 and 114 respectively.

The kitchen dispenser 100 further comprises a movable dispensing mechanism 116 coupled to the bottom portion of the canister 105 by use of bottom portion 120. The bottom portion 120 is coupled to the front portion 110 using clips 121 that slideably engage recesses on the bottom side of the front portion. The bottom portion 120 forms a drawer opening that receives and retains the dispensing mechanism 116. The dispensing mechanism 116 comprises a variable measurement device 134 corresponding to the aperture 144 in the bottom side of the front portion 110 (See FIG. 17). The dispensing mechanism 116 is moveable between a dispensing position and a filling position, wherein in the filling position, the measurement device 134 is in a position under the aperture 144 for receiving dry goods stored within the open space of the canister 100 and in the dispensing position, the measurement device 134 is in a position external to the canister 105.

The kitchen dispenser 100 may further comprise a scraper member 160 coupled to the bottom side of the front portion 110. The scraper member 160 is in contact with a top side of the dispensing mechanism 116 during movement between the filling and dispensing positions. The kitchen dispenser 100 may also comprise a view window 118 for displaying a level of dry goods retained within the open space of the canister 105.

The kitchen dispenser 100 may also include a mixer 150 for mixing the dry goods to ensure no formation of pockets within the dry goods. The mixer 150 includes a mixing portion 152 operably coupled to knob 122, wherein a user manually turns the knob 122 to mix the dry goods with the mixing portion 152 of the mixer 150. The mixer 150 may be coupled to the front portion 110 through aperture 123, wherein the knob 122 extends through aperture 123 and couples to the mixing portion 152, the mixing portion 152 being within the open space defined between the front portion 110, the back portion 114 and the lid 112 of the canister 105. The nut 156 functions to prevent the knob 122 from being removed from the canister 105.

Figure 16:
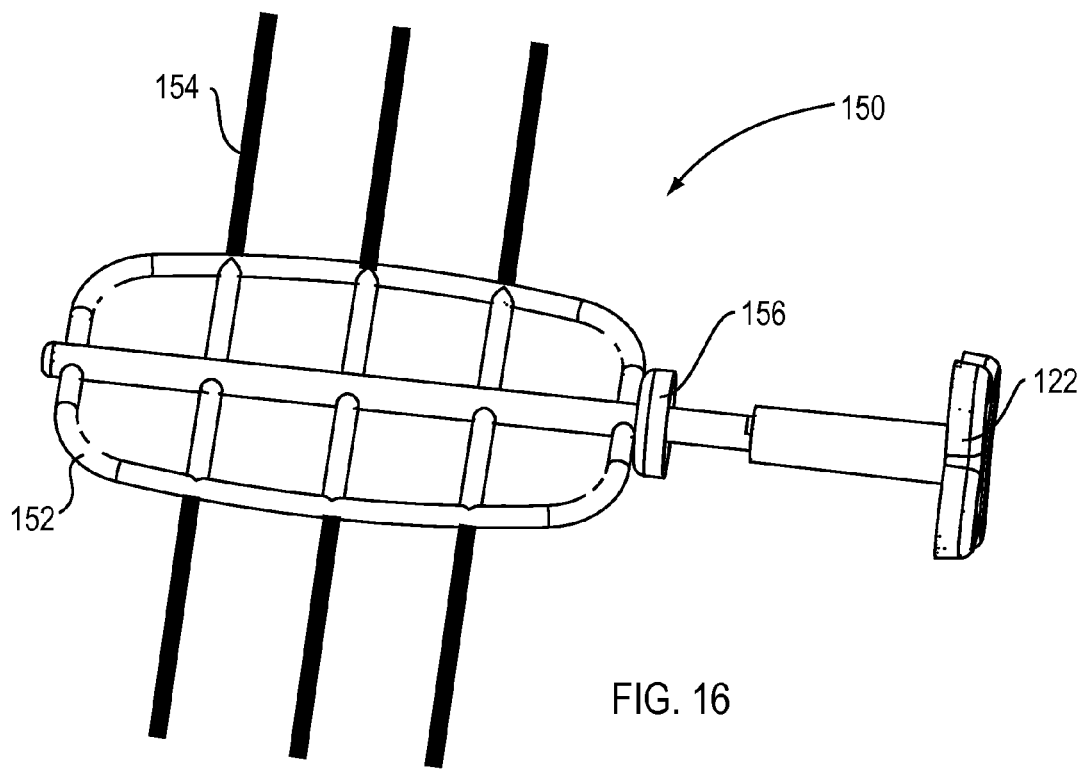
FIG. 16 is a perspective view of a mixer device of the present invention.

The mixer 150, in particular embodiments of the present invention, includes extension members 154, as further shown in FIG. 16. The extension members 154 serve to further mix the dry goods retained within the canister 105 and also serve to clean the view window 118 in response to rotation of the mixing portion 152. The extension members 154 are of a sufficient length so as to contact the view window 118 and brush any dry goods residue from the view window 118 in order to accurate determine the level of the dry goods retained within the canister 105.

While the mixer 150 is shown as a manually operated device, particular embodiments include an automated or semi-automated device. The automated device may mix as the dispensing mechanism is moved from the filling position to the dispensing position. The semi-automated mixer may include an actuator button that is depressible by a user, wherein the mixer is electromechanical and operates in response to the depressing of the actuator.

Figure 10:
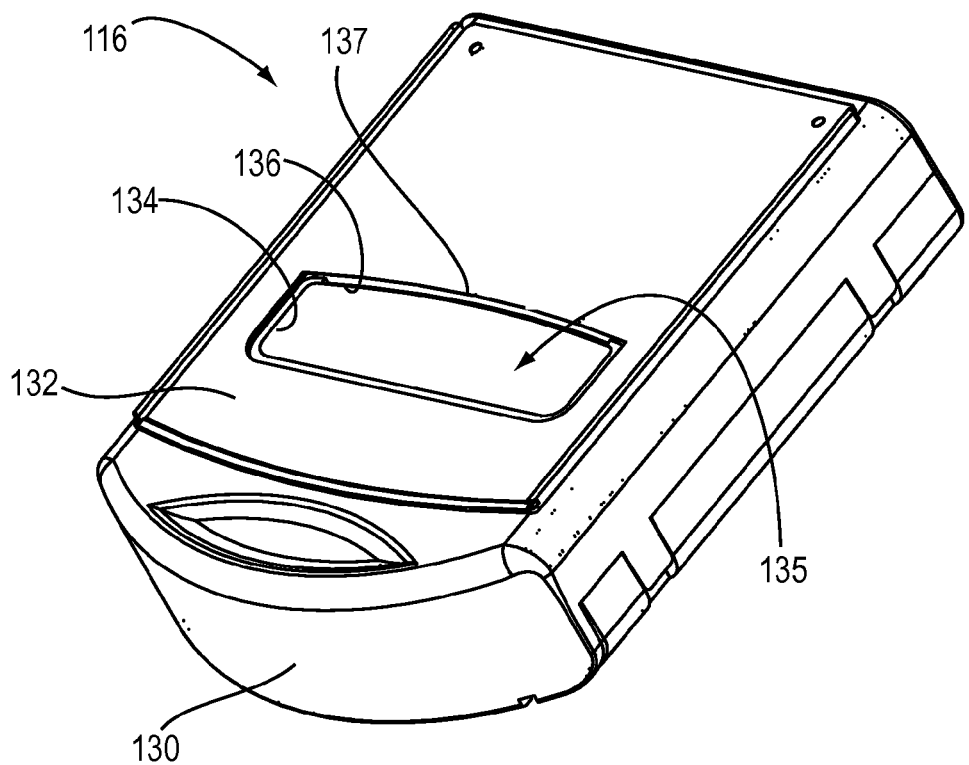
FIGS. 10 and 11 are perspective views of a dispensing mechanism of the present invention.
Figure 11:
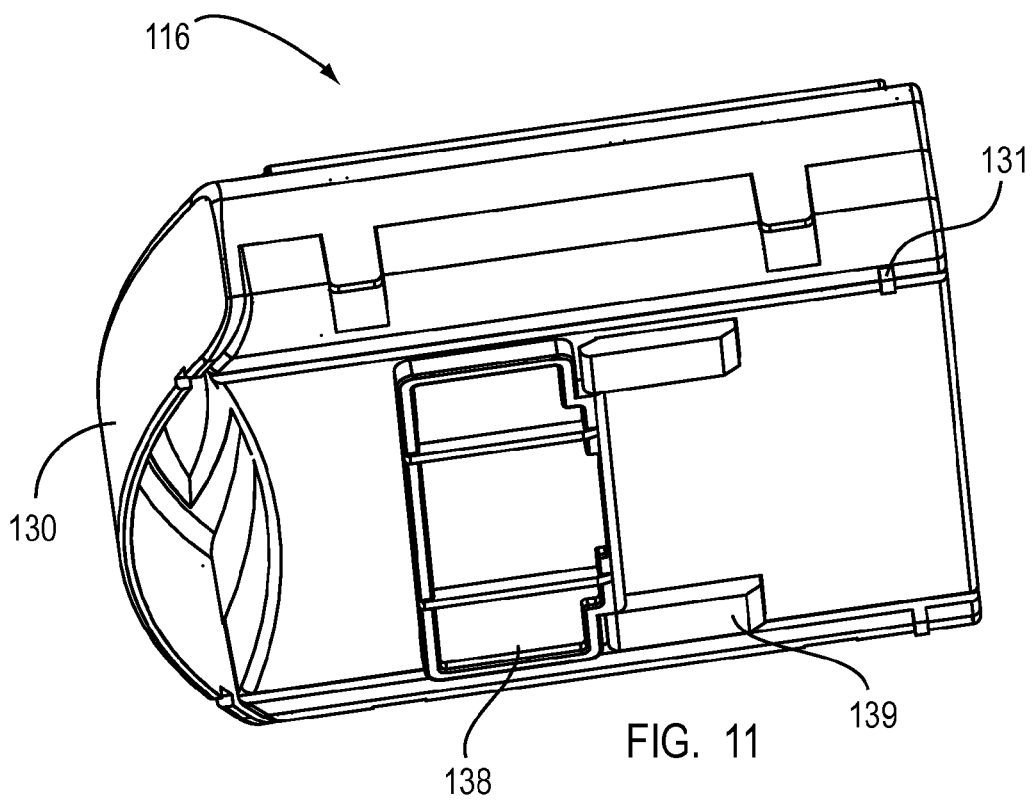
Figure 12:
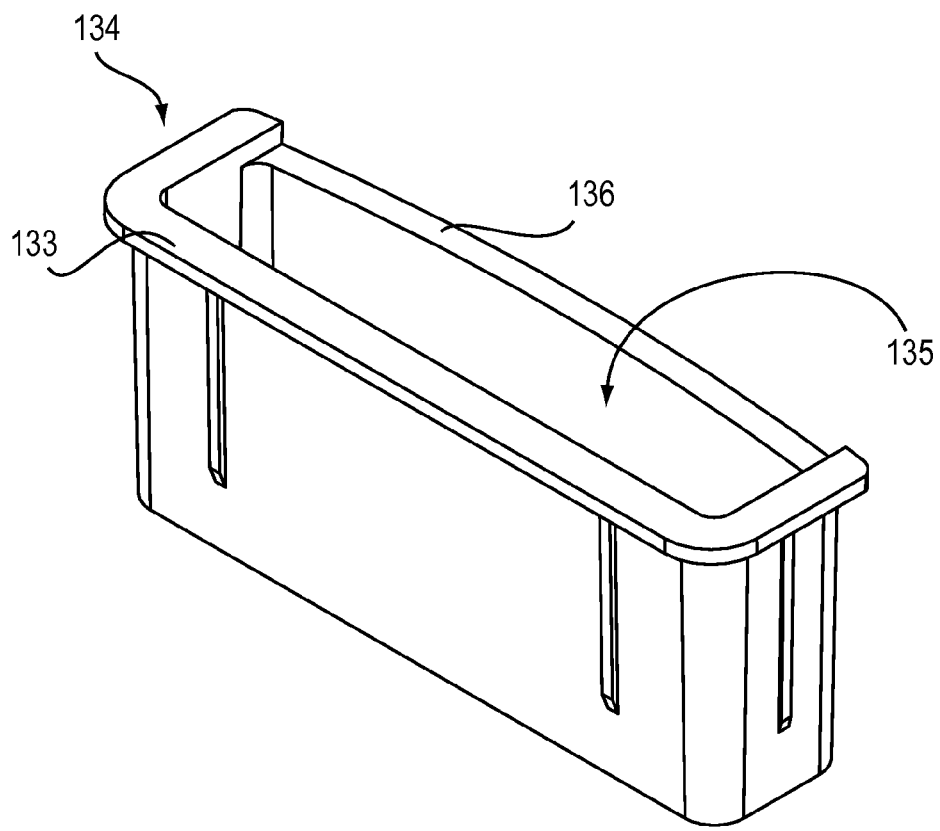
FIG. 12 is a perspective view of measuring cup of the present invention.

Referring further to the drawings, FIGS. 10 and 11 depict the dispensing mechanism 116 in accordance with particular embodiments of the present invention. The dispensing mechanism comprises a leveling plate 132 coupled to a top surface of the dispensing mechanism 116 and a grip portion 130, wherein a user manually grabs the grip portion 130 and moves the dispensing mechanism 116 between the filling position and the dispensing position. The leveling plate 132 is in contact with the scraper member 160. Contact between the leveling plate 132 and the scraper member 160 results in the leveling of dry goods within the measurement device 134 when moving the dispensing mechanism 116 from the filling position to the dispensing position. The leveling surface 132 further comprises a cutting edge 137. The cutting edge 137 cuts dry goods in response to moving the dispensing mechanism 116 from the filling position to the dispensing position. Dry goods, such as rice grains or coffee beans, are cut as the dry goods extend beyond the leveling plate 132. The grains contact a scraper protrusion 164 of the scraper member 160 (See FIG. 15). As the grains contact the scraper protrusion the cutting edge then contacts the grains and cuts the grains in response to the force applied to the grip portion 130 of the dispensing mechanism 116 in moving the dispensing mechanism 116 from the filling position to the dispensing position.

Figure 14:
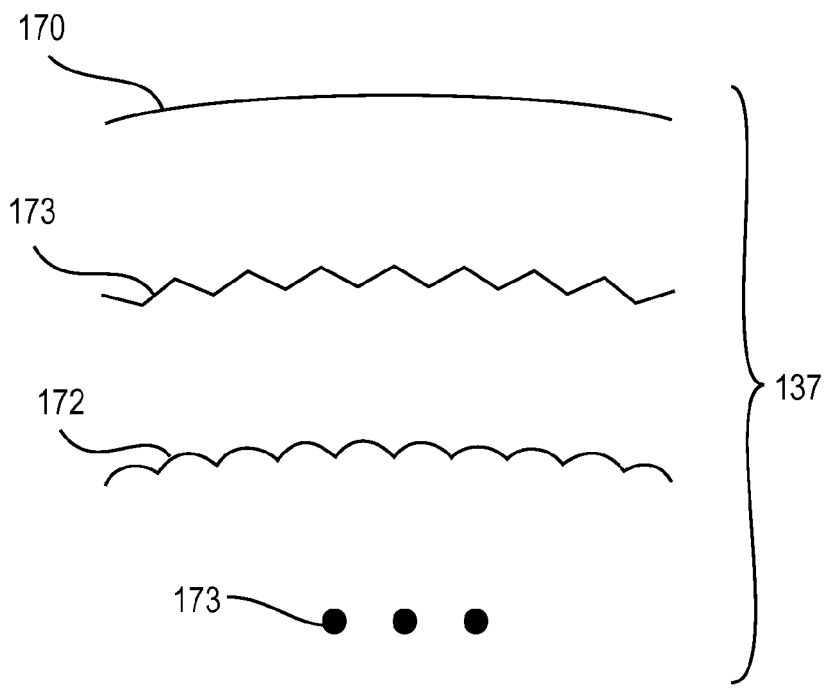
FIG. 14 is a tip view of various configurations of cutting edges of the dispensing mechanism of FIG. 10.
Figure 13:
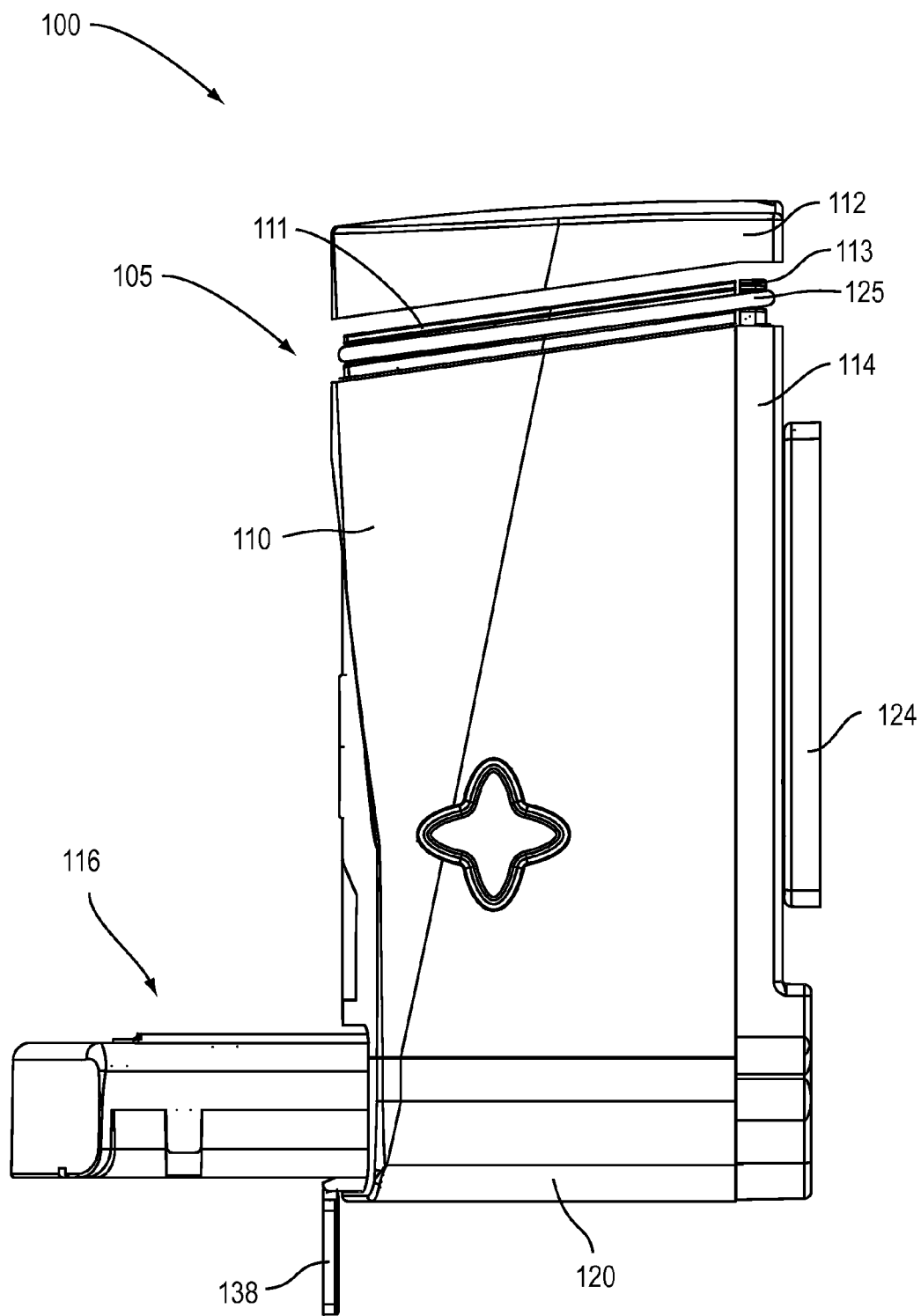
FIG. 13 is a side view of a kitchen dispenser with the dispensing mechanism extended from the canister.

As shown in FIG. 14, the cutting edge 137 may be one of an arched straight edge 170, an arched jagged edge 171, and arched serrated edge 172, and other types of edges 173, such as but not limited to a straight edge, a jagged edge, a scalloped edge and a serrated edge.

One particular aspect of the cutting surface includes the arched jagged edge 171. Because the cutting edge 171 is jagged only so many grains can fit within each jagged section of the cutting edge 171. When the grains contact the scraper protrusion 164, the arch in the cutting edge 171 results in only the grains associated with no more than two jagged areas of the cutting edge 171. This means that only two grains at a time can be cut, thereby resulting in a more efficient cut of the grains, as well as the preventing of dispensing device 116 becoming inoperable due to the stresses it would face if the cutting edge 137 were trying to cut many grains at one particular time.

The measuring device 134 of the dispensing device 116 is removably coupled to the dispensing device 134. The measuring device 134 includes a lowered edge 136 and an aperture 135 extending through the measuring device 134. The lowered edge allows the cutting edge to function by placing the edge 136 lower than the cutting such that the cutting edge 137 may still operated to cut grains of the dry goods stored within the canister 105. It will be understood that the measuring device 134 may be of various typical sizes as previously explained in this specification.

The measuring device 134 is removably coupled within an aperture of the dispensing device 116. The measuring device 134 includes an edge 133 that extends away from the measuring device 134. The edge 133 engages a ledge adjacent the aperture of the dispensing device 116, wherein the ledge retains the measuring device in proper position within the dispensing mechanism 116. The variable measurement device 134 may vary in size. For example, the measuring device 134 includes multiple measuring devices of different discrete quantity sizes, rendering the measuring device a variable measuring device which varies by discrete sizes. These discrete sizes, may include, but are not limited to ¼ cup, ⅓ cup, 1 cup, and metric measurements such as 25 cc.

Figure 9A:
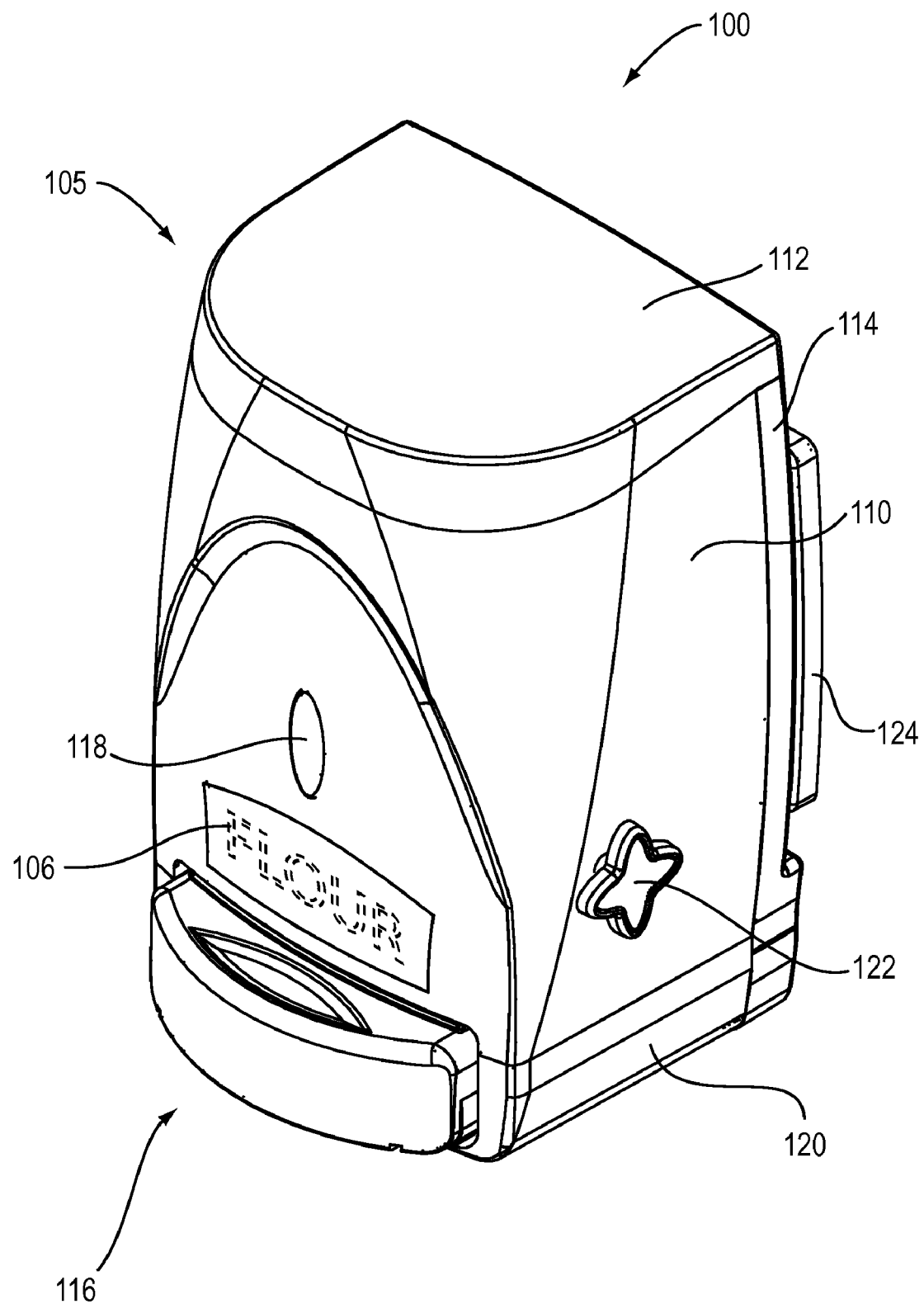
FIG. 9A is a perspective view of a kitchen dispenser according to embodiments of the present invention.
Figure 9B:
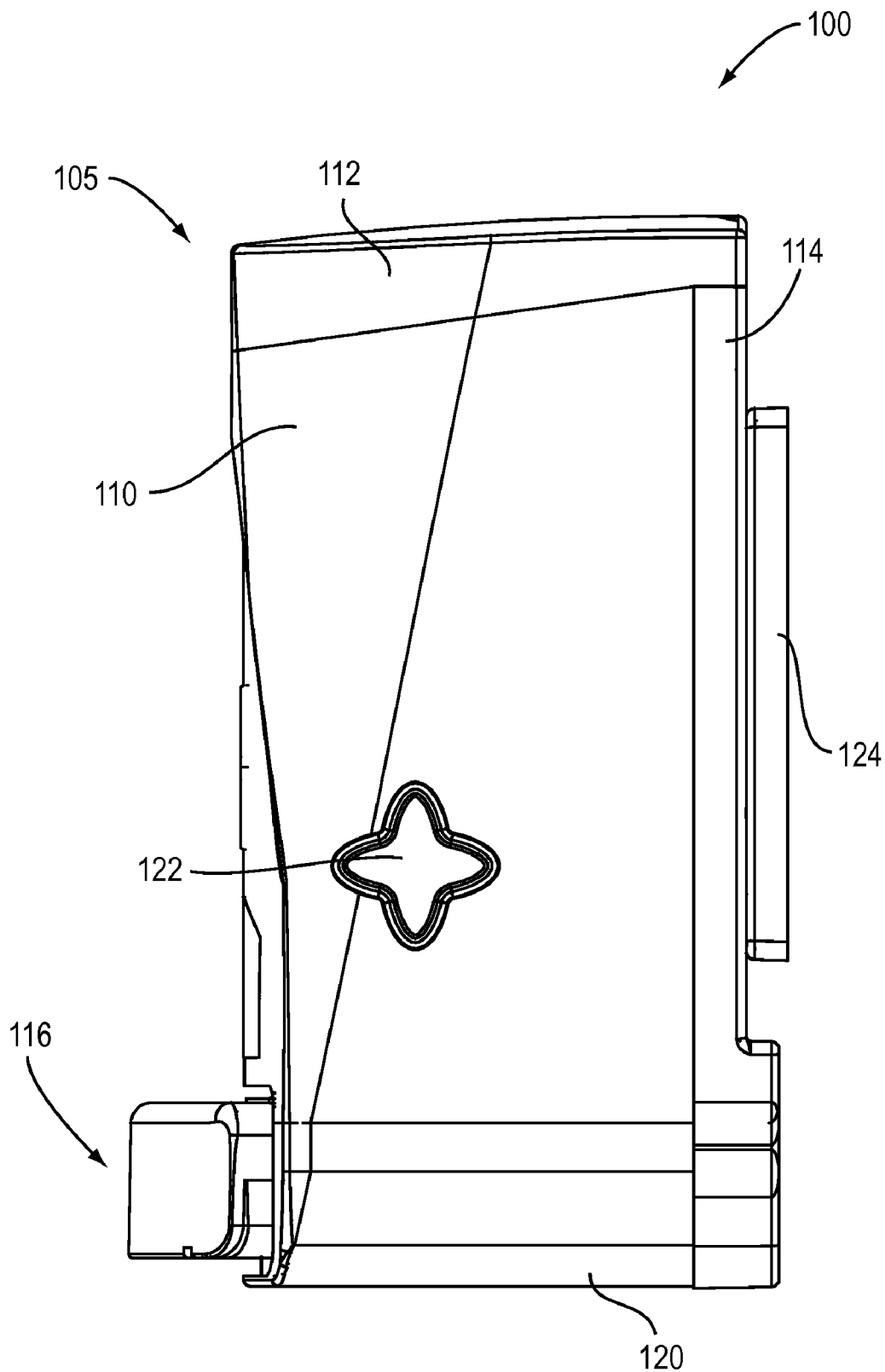
FIG. 9B is a side view of the kitchen dispenser of FIG. 9A.
Figure 9C:
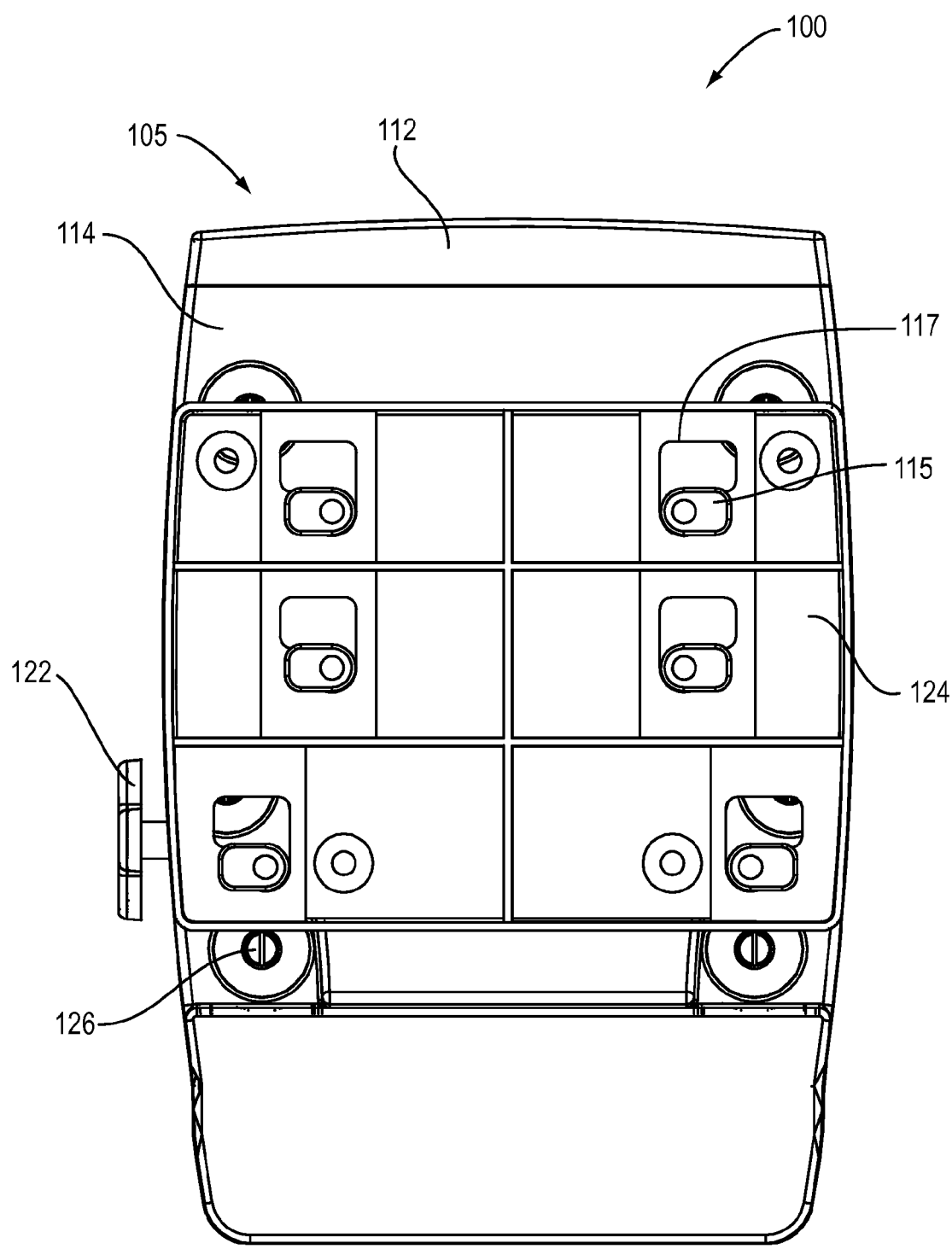
FIG. 9C is a back view of the kitchen dispenser of FIG. 9A.

The dispensing mechanism 116 further comprises a rotatable door 138 coupled to a bottom surface of the dispensing mechanism 116 by use of brackets 139. The rotatable door 138 moves between a closed and opened position in response to movement of the dispensing mechanism 116 between the filling and dispensing position. In the filling position the rotatable door 138 contacts an edge of the bottom portion 120 and the door 138 is rotated into the closed position as shown in FIG. 9A-9B. When the dispensing mechanism 116 is moved to the dispensing position the door 138 is free to rotate because it is no longer being held in the closed position by the bottom portion 120. Gravitational forces act upon the door 138 and it is rotated into the open position, thereby releasing the dry goods held within the measuring device 134. The dry goods may be dispensed into any container desired by the user.

Figure 9D:
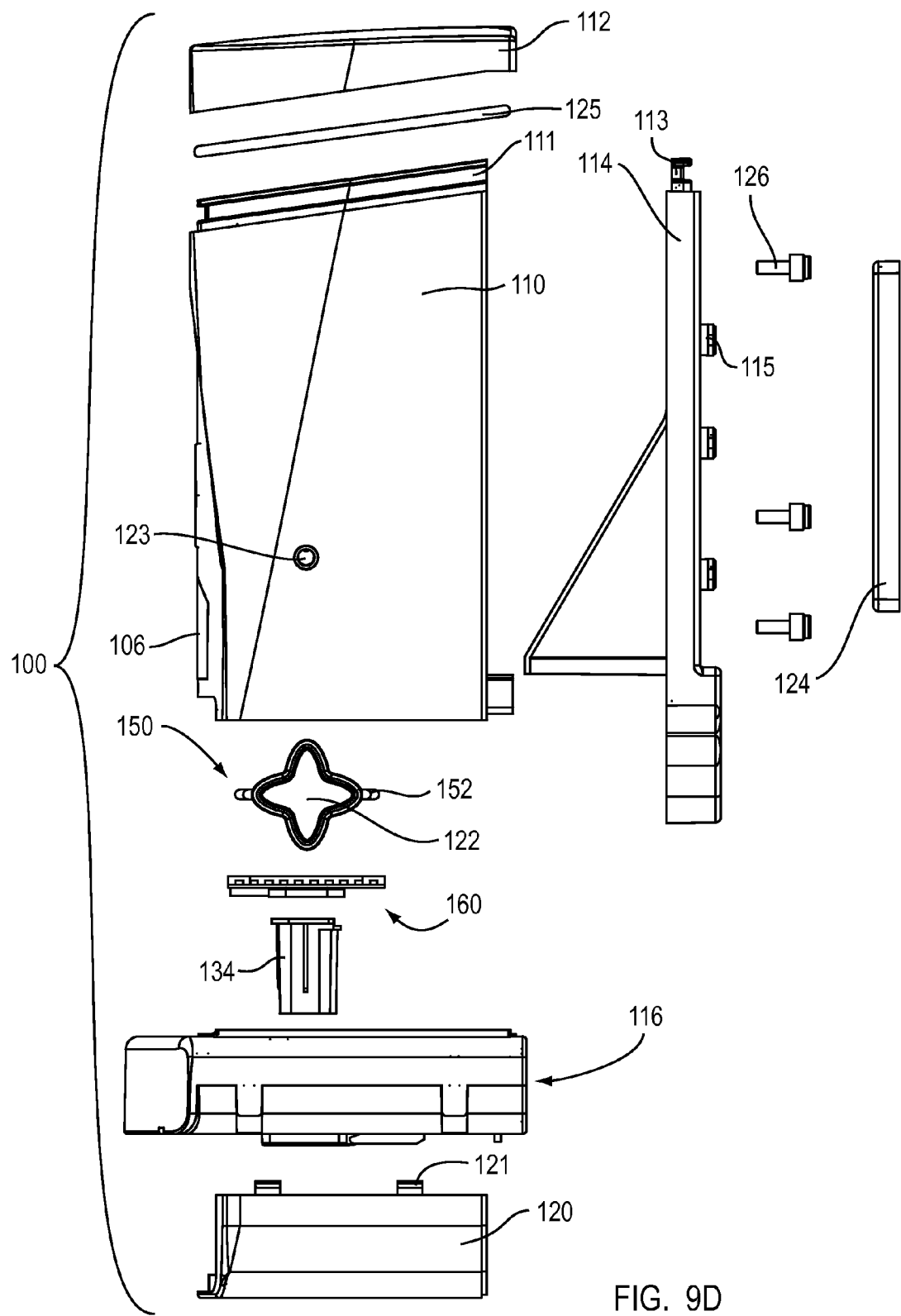
FIG. 9D is an exploded side view of the kitchen dispenser of FIG. 9A.
Figure 15:
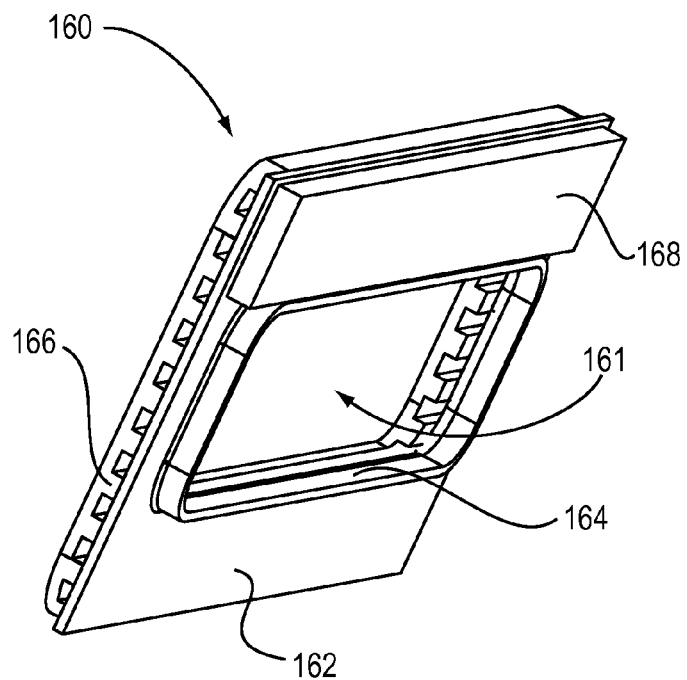
FIG. 15 is a perspective view of a scraper device of the present invention.

In order to reduce leaking of dry goods out of the kitchen dispenser 100, and to further provide for more level dispensing of dry goods within the dispensing mechanism 116, the kitchen dispenser 100 further includes a scraper member 160, shown in FIGS. 9D and 15, that is coupled to a bottom side of the front portion 110. The scraper member 160 includes scraper plate 162 that has a scraper protrusion 164 and an aperture extending through the scraper plate 162 with the scraper protrusion 164 surrounding the aperture 161. The scraper member includes an elastomeric member 166. The elastomeric member is coupled between the front portion 110 and the scraper plate 162. The elastomeric member 166 includes an aperture corresponding to the scraper aperture 161. The elastomeric member 166 functions to bias the scraper plate toward the dispensing mechanism 116, wherein the scraper protrusion 164 is constant contact with the leveling plate 132 of the dispensing mechanism 116 in response to the biasing provided by the elastomeric member 116.

The scraper member 160 further includes a cleaning member 168. The cleaning member 168 wipes dry goods particles off of the leveling plate 132 of the dispensing mechanism 116. The cleaning member may be an elastomeric material to ensure constant contact with the leveling plate 132.

The dispensing mechanism 116, referring further to FIG. 11, further comprising a stopping members 131. The stopping members comprise a first protrusion extending from the measurement device 116, wherein the first protrusion 102 engages a second protrusion extending from the bottom portion 120 to prevent the dispensing mechanism 116 from being removed from the canister 105 when the canister 105 is completely assembled.

Another particular embodiment of the present invention includes a method of using a kitchen dispenser. The method comprises the steps of assembling a canister of the kitchen dispenser; dispensing the dry goods in response to moving the measurement device from a filling position to a dispensing position; and disassembling the canister for cleaning the canister.

The method may further comprise varying the amount of product dispensed by the dispensing mechanism. The method may also include inserting a sizing insert within the dispensing mechanism to vary the amount of product dispensed. Other steps of the method optionally include agitating the dry goods within the canister to prevent development of a pocket within the dry goo and cutting dry goods with the variable measurement device of the dispensing mechanism when moving the dispensing mechanism from a filling to a dispensing position.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the present invention.

The invention claimed is:

1. A kitchen dispenser for storing and dispensing dry goods, the dispenser comprising:
   a canister having a front portion, a back portion and a lid repeatably and releasably coupled together, wherein an open space is defined between the front portion, rear portion and lid;
   an aperture in a bottom side of the front portion;
   a movable dispensing mechanism coupled to the bottom portion of the canister, wherein the dispensing mechanism comprises a variable measurement device corresponding to the aperture in the bottom side of the front portion, the dispensing mechanism moveable between a dispensing position and a filling position, wherein in the filling position, the measurement device is aligned with the aperture for receiving dry goods stored within the open space of the canister and in the dispensing position, the measurement device is external to the canister; and
   a scraper plate coupled to the bottom side of the front portion, the scraper plate in contact with a top side of the dispensing mechanism during movement between the filling and dispensing positions, wherein the dispensing mechanism further comprises a leveling plate coupled to a top surface of the dispensing mechanism, the leveling plate being in contact with the scraper plate.

2. The dispenser of claim 1, further comprising a view window for displaying a level of dry goods retained within the open space of the canister.

3. The dispenser of claim 2, further comprising a mixer having extension arms for agitating the dry goods to ensure no formation of pockets within the dry goods.

4. The dispenser of claim 3, wherein the mixer cleans the view window in response to rotation of the agitating extension arms.

5. The dispenser of claim 1, wherein contact between the leveling plate and the scraper plate result in the leveling of dry goods within the measurement device when moving the dispensing mechanism from the filling position to the dispensing position.

6. The dispenser of claim 5, wherein the leveling surface further comprises a cutting edge, the cutting edge cutting dry goods in response to moving the dispensing mechanism from the filling position to the dispensing position.

7. The dispenser of claim 6, wherein the cutting edge is a one of a straight edge, a serrated edge, a jagged edge, an arched serrated edge, an arched jagged edge and a scalloped edge.

8. The dispenser of claim 1, further comprising an elastomeric member coupled between the scraper plate and the bottom side of the front portion of the canister, wherein the washer pushes on the scraper plate to contact the leveling plate when the dispensing mechanism is moving from the filling position to the dispensing position.

9. The dispenser of claim 1, wherein the contact between the scraper surface and the leveling surface prevents leaking of dry goods from within the canister.

10. The dispenser of claim 5, further comprising a rotatable door coupled to a bottom surface of the dispensing mechanism, wherein the rotatable door moves between a closed and opened position in response to movement of the dispensing mechanism between the filling and dispensing position.

11. The dispenser of claim 10, wherein the variable measurement device further comprises sizing inserts to vary the size of the variable measurement device.

12. The dispenser of claim 11, wherein the sizing insert comprises a lowered edge, wherein the lowered edge provides a space wherein the lowered edge exposes the cutting edge.

13. The dispenser of claim 1, further comprising a stopping mechanism comprising a first protrusion on the bottom side of the front portion of the canister and a second protrusion extending from the measurement device, wherein the first protrusion engages the second protrusion to prevent the dispensing mechanism from being removed from the canister.

14. The dispenser of claim 1, further comprising an o-ring, wherein the o-ring retains top sides of the front and back portions of the canister together and provides a seal engaging the lid when the lid is coupled to the front and back portions.

15. A method of using a kitchen dispenser, the kitchen dispenser comprising a canister having a front portion, a back portion and a lid repeatably and releasably coupled together, wherein an open space is defined between the front portion, rear portion and lid; an aperture in a bottom side of the front portion; a movable dispensing mechanism coupled to the bottom portion of the canister; and a scraper plate coupled to the bottom side of the front portion, the scraper plate in contact with a top side of the dispensing mechanism during movement between the filling and dispensing positions, wherein the dispensing mechanism further comprises a leveling plate coupled to a top surface of the dispensing mechanism, the leveling plate being in contact with the scraper plate; the method comprising:
  assembling the canister of the kitchen dispenser;
  dispensing the dry goods in response to moving the measurement device from a filling position to a dispensing position; and
  disassembling the canister for cleaning the canister.

16. The method of claim 15, further comprising varying the amount of product dispensed by the dispensing mechanism.

17. The method of claim 16, further comprising inserting a sizing insert within the dispensing mechanism to vary the amount of product dispensed.

18. The method of claim 15, further comprising agitating the dry goods within the canister to prevent development of a pocket within the dry good.

19. The method of claim 15, comprising cutting dry goods with the variable measurement device of the dispensing mechanism when moving the dispensing mechanism from a filling to a dispensing position.

* * * * *